United States Patent
Jacobs et al.

(10) Patent No.: US 7,158,506 B2
(45) Date of Patent: Jan. 2, 2007

(54) DATA MANAGER FOR WIRELESS COMMUNICATION DEVICES AND METHOD OF MANAGING DATA IN A WIRELESS DEVICE

(75) Inventors: Paul E. Jacobs, San Diego, CA (US); David J. Ross, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 879 days.

(21) Appl. No.: 09/871,471

(22) Filed: May 31, 2001

(65) Prior Publication Data

US 2002/0183079 A1  Dec. 5, 2002

(51) Int. Cl.
    *H04L 12/66*  (2006.01)
(52) U.S. Cl. ............... 370/352; 455/557; 455/552.1
(58) Field of Classification Search ............ 455/466; 370/206, 342, 443
    See application file for complete search history.

(56) References Cited

U.S. PATENT DOCUMENTS

| 5,835,480 | A | * | 11/1998 | Chennakeshu | ........ 370/206 |
| 6,041,054 | A | * | 3/2000 | Westberg | ........ 370/389 |
| 6,282,182 | B1 | * | 8/2001 | Pecen et al. | ........ 370/336 |
| 6,591,118 | B1 | * | 7/2003 | Han | ........ 455/570 |
| 6,704,576 | B1 | * | 3/2004 | Brachman et al. | ........ 455/503 |
| 7,072,336 | B1 | * | 7/2006 | Barany et al. | ........ 370/389 |
| 2001/0001268 | A1 | * | 5/2001 | Menon et al. | ........ 370/329 |
| 2003/0007606 | A1 | * | 1/2003 | Suder et al. | ........ 379/32.04 |
| 2004/0210635 | A1 | * | 10/2004 | Raniere et al. | ........ 709/204 |
| 2004/0218571 | A1 | * | 11/2004 | Pascazi | ........ 370/338 |

FOREIGN PATENT DOCUMENTS

| WO | 9609708 | | 3/1996 |
| WO | 9916266 | | 4/1999 |
| WO | 0041416 | | 7/2000 |
| WO | WO 0041416 | * | 7/2000 |

* cited by examiner

*Primary Examiner*—Charles N Appiah
*Assistant Examiner*—Joy Contee
(74) *Attorney, Agent, or Firm*—Philip Wadsworth; Bruce W. Greenhaus; James D. McFarland

(57) ABSTRACT

A data manager, and a method of managing data, for a wireless device. The data manager includes a data receiver that receives voice data over the internet protocol connection, a data sender that sends other voice data over the internet protocol connection, a data recognizer that differentiates the voice data and the other voice data from non-voice data and non-data, and a controller that broadcasts the voice data and the other voice data in an internet voice protocol format. The method includes the steps of receiving voice data over the internet protocol connection at the wireless device, sending other voice data over the internet protocol connection from the wireless device, differentiating the voice data from non-voice data and non-data, differentiating the other voice data from other non-voice data and non-data, and controlling the broadcast of the voice data, and the other voice data.

46 Claims, 5 Drawing Sheets

DATA MANAGER FOR WIRELESS COMMUNICATION DEVICES AND METHOD OF MANAGING DATA IN A WIRELESS DEVICE

BACKGROUND OF THE INVENTION

1. Field of the Invention

The present invention is directed generally to a method and apparatus for managing data, more particularly, to a data manager for wireless communication devices and a method of managing data in a wireless device.

2. Description of the Background

Web phones, which are cellular telephones capable of communicating with the internet, are becoming more prevalent in the field of cellular technology. In addition to having internet capability, these phones are also capable of operating over a standard wireless telephone network as a standard telephone. However, the two modes available in these web phones are mutually exclusive.

When the web phone is operating over the internet, it cannot be used for vocal communication. When the web phone is operating as a standard telephone, it cannot be used for internet interaction. This operation for web phones forecloses a myriad of possible communication methods for the web phone. For example, the web phone is not capable of real time communication of voice patterns to the user while in web mode. Thus, the user cannot interact with voice files, cannot engage in conversations using chat rooms on the internet, and cannot take advantage of the free long distance calling available over the internet. Furthermore, the web phone is not capable of internet browsing during voice communications. Thus, the user cannot take advantage, while in voice communication mode, of the wealth of information and services available, either directly or by searching, over the internet.

Further, current web phones, even if made capable of dual mode operation, are not capable of communicating at data rates necessary to eliminate latency in voice packets transmitted over an IP connection, partly due to the inability to manage such high speed data. The speeds necessary for such communication may be 2 Mbits or higher.

Therefore, the need exists for a web phone that allows communication in dual modes, and that is capable of eliminating latency for voice communications over an IP connection.

BRIEF SUMMARY OF THE INVENTION

The present invention is directed to a data manager for a wireless device, wherein the wireless device sends and receives a plurality of broadcasts between the wireless device and at least one remote device over an internet protocol connection. The data manager includes a data receiver that receives voice data over the internet protocol connection, a data sender that sends other voice data over the internet protocol connection, a data recognizer that differentiates the voice data and the other voice data from non-voice data and non-data, and a controller that broadcasts the voice data and the other voice data in an internet voice protocol format during the internet protocol connection, according to the differentiation by the data recognizer. In a preferred embodiment, the data manager is a modular software device located within the wireless device.

The present invention also includes a method of managing data in a wireless device, wherein the wireless device sends and receives a plurality of broadcasts between the wireless device and at least one remote device over an internet protocol connection. The method includes the steps of receiving voice data over the internet protocol connection at the wireless device, sending other voice data over the internet protocol connection from the wireless device, differentiating the voice data from non-voice data and non-data, differentiating the other voice data from other non-voice data and non-data, and controlling the broadcast of the voice data according to the differentiating the voice data from the non-voice data and the non-data, and the broadcast of the other voice data according to the differentiating the other voice data from the other non-voice data and the non-data. The controlling step uses a first internet protocol format, such as an internet voice protocol format, for broadcast of the voice data and the other voice data over the internet protocol connection, and uses a second internet protocol format for the broadcast of non-voice data and other non-voice data. The controlling step preferably activates a CODEC, which in turn activates a voice coder to use the first internet protocol format.

Furthermore, the present invention includes a wireless data communication system. The system includes an internet protocol communication network, and at least two devices, wherein at least one of the devices is a wireless device, wherein each device is connected to the internet protocol communication network, wherein each device communicates with at least one other of the devices over said internet protocol communication network, and wherein the communication is controlled by at least one data manager resident at and communicatively connected to each wireless device.

The present invention solves problems experienced with the prior art because it provides dual mode communication in a single call. The two modes are standard internet data communication, and voice formatted internet data communication. Additionally, the present invention manages data, thereby allowing for an increased speed of communication and the elimination of latency in internet voice communications. Those and other advantages and benefits of the present invention will become apparent from the detailed description of the invention hereinbelow.

BRIEF DESCRIPTION OF THE SEVERAL VIEWS OF THE DRAWING

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical wireless communication system. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
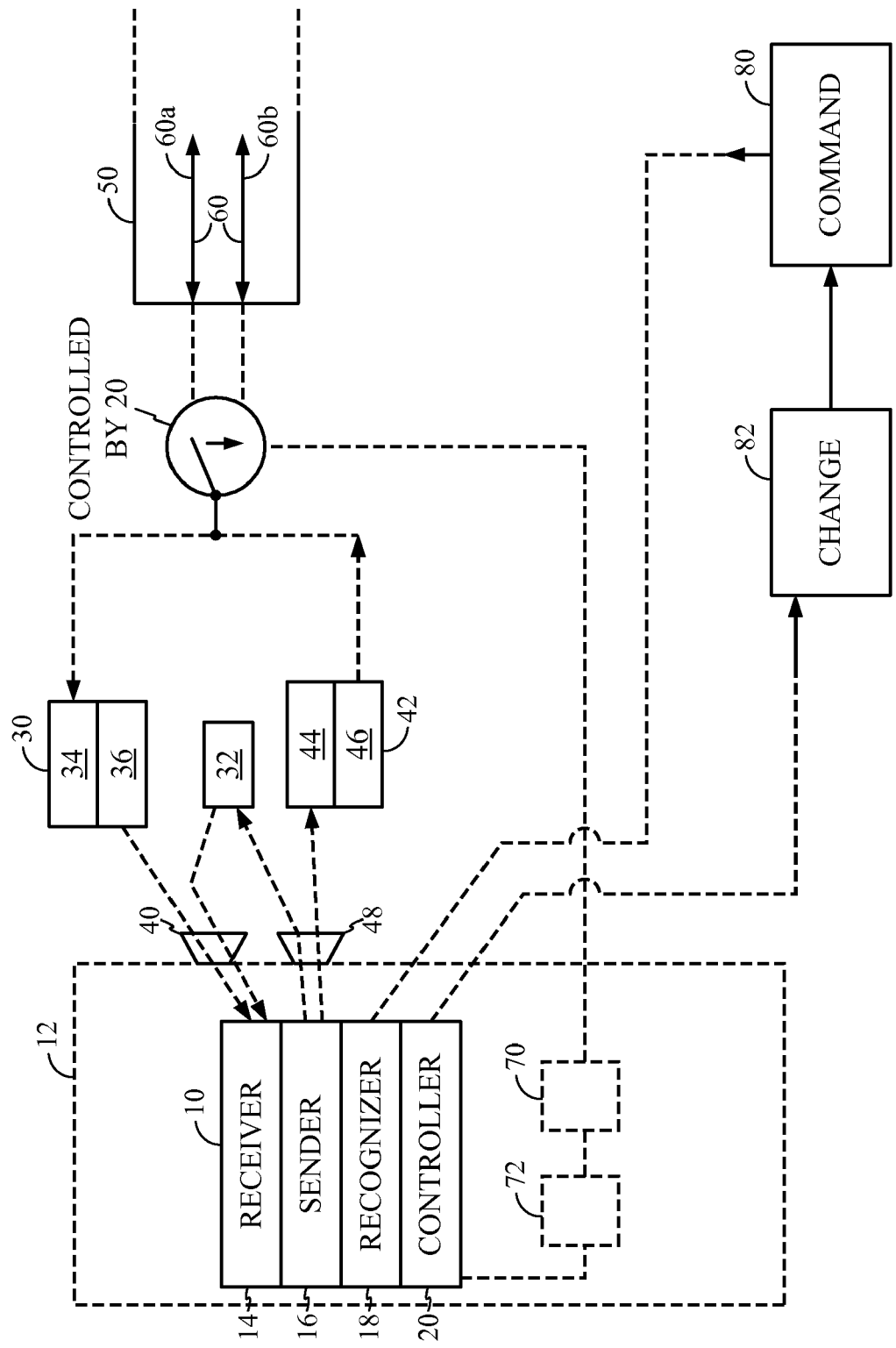
FIG. 1 is a schematic diagram illustrating a data manager for a wireless device.

FIG. 1 is a schematic diagram illustrating a data manager 10 for a wireless device 12. The data manager 10 is communicatively connected to the wireless device 12, and includes a data receiver 14, a data sender 16, a data recognizer 18, and a controller 20.

The data receiver 14 receives data 30, and may receive non-data 32. As used herein, "data" is electronic information passing over an internet protocol connection 50, and "non-data" is electronic information passing over a standard telephonic connection, such as a wireless telephone connection. The data 30 received by the data receiver 14 may include voice data 34 and/or non-voice data 36. Voice data 34 is data 30 passed over the internet protocol connection 50 according to standards for real-time audio packetized information, as is known in the art, while non-voice data 36 may be passed over the internet protocol connection 50 in standard internet connection packets, as is known in the art. The data receiver 14, in a preferred embodiment, is embodied in software, which software may be resident on the wireless device 12, or may be in a communicative connection with the wireless device 12. The data 30 received by the data receiver 14 is preferably passed to the data receiver 14 from a hardware data input 40 in the wireless device 12. The data input 40 is the portion of the wireless device 12, such as a wireless telephone, that receives and decodes radio information received from the environment, such as the information that a user would hear as being broadcast through the earpiece of a wireless telephone during a standard wireless telephonic connection. The data input 40 is known in the art.

The data sender 16 sends other data 42, and may send non-data 32. As used herein, "other data" is electronic information passing over an internet protocol connection 50. Also, as used herein, the term "other", when used in reference to types of data, signifies outgoing data, while data not referred to as "other" is incoming data. The other data 42 sent by the data sender 16 may include other voice data 44 and/or other non-voice data 46. The data sender 16, in a preferred embodiment, is embodied in software, which software may be resident on the wireless device 12, or may be in a communicative connection with the wireless device 12. The other data 42 sent by the data sender 16 is preferably sent through a hardware data output 48 in the wireless device 12. The data output 48 is the portion of the wireless device 12, such as a wireless telephone, that encodes and then broadcasts radio information into the environment, such as the information that would be broadcast after a user speaks into the mouthpiece of a wireless telephone during a standard wireless telephonic connection. The data output 48 is known in the art.

The data recognizer 18 differentiates the voice data 34 and the other voice data 44 from the non-voice data 36 and the other non-voice data 46, at the data receiver 14 and the data sender 16, respectively, and may differentiate data 30 and other data 42 from non-data 32. The data recognizer 18, in a preferred embodiment of the present invention, operates automatically on all data 30, all other data 42, and may operate on all non-data 32 to differentiate the type of data 30 or other data 42 being received or sent. The data recognizer 18, in a preferred embodiment, is embodied in software, which software may be resident on the wireless device 12, or may be in a remote communicative connection with the wireless device 12. The data recognizer 18 software preferably continuously monitors the input 40 and output 48 of the wireless device 12 for any new data 30, other data 42, or non-data 32, and for any changes in the then-current type of data 30, other data 42, or non-data 32. When new information or changed information is differentiated by the data recognizer 18, the data recognizer 18 may automatically pass the differentiation to the controller 20, and may notify the user of the change, or may notify the user of the change and await instructions from the user before passing the differentiation to the controller 20, or may pass the differentiation to the controller 20 automatically while the controller 20 awaits instructions from the user, as discussed hereinbelow.

The controller 20 controls the broadcast 60 of electronic information at the data receiver 14 to the user, and the broadcast 60 of electronic information at the data sender 16 to the environment. The controller 20 controls whether the broadcast 60 at the data receiver 14 occurs as voice data 34 or non-voice data 36, and controls whether the broadcast 60 at the data sender 16 occurs as other voice data 44 or other non-voice data 46. Thus, the controller 20 controls the format of the incoming and outgoing broadcasts 60 over the internet protocol connection 50, according to the standards discussed hereinabove. In a preferred embodiment, the controller 20 controls the broadcast 60 according to the differentiation by the data recognizer 18. This controlling preferably includes switching the broadcasts 60 of the wireless device 12 to a first internet protocol format 60$b$ for the broadcast of voice data 34 or other voice data 44, and switching the broadcasts 60 of the wireless device 12 to at least one second internet protocol format 60$a$ for the broadcast 60 of non-voice data 36 or other non-voice data 46. In a preferred embodiment, this switching to the first internet protocol 60$a$ includes the activating by the controller 20 of a voice coder 70, which activating preferably occurs after the controller 20 instructs the CODEC 72 to activate the voice coder 70. The voice coder 70 allows the sending of voice packets over the internet protocol connection 50. The voice coder 70 is preferably a hardware or software device for decoding and encoding audio information, as is known in the art. This switching may occur during a single communication, such as a single internet protocol communication, or may occur between at least two separate communications on the wireless device 12. For example, in the former instance, the wireless device 12 would be broadcasting non-voice data 36 in a first call over the internet protocol connection 50, and then receive voice data 34, at which point the controller 20 would switch that first call to broadcast voice data 34 over the internet protocol communication 50. In a second example, in the instance wherein the first call is a broadcast 60$a$ of voice data 34 and/or other voice data 44 over the internet protocol connection 50, and new information was also voice data 34 and/or other voice data 44, the controller 20 would not switch the broadcast 60$a$.

In one embodiment of the present invention, the first internet protocol format 60$a$ is an internet voice protocol format. In the preferred embodiment, the first internet protocol 60$a$ substantially eliminates latency in the broadcast 60, thereby improving the voice communications broadcast 60. In order to eliminate latency, the broadcasts 60 may occur at communication rates of up to 2 MegaBits per second. The controller 20 preferably allows standard telephonic communication operation of the wireless device 12 during the broadcast of non-data 32. The controller 20, in a preferred embodiment, is embodied in software, which software may be resident on the wireless device 12, or may be in a communicative connection with the wireless device 12.

In the embodiment wherein the differentiation of the data recognizer 18 is passed automatically to the controller 20, the controller 20 preferably switches from the first internet protocol 60a to the at least one second internet protocol 60b, or from the at least one second internet protocol 60b to the first internet protocol 60a, automatically according to the type of data 30, other data 42, or non-data 32 differentiated by the data recognizer 18. In a second embodiment, the controller 20 switches from the first internet protocol 60a to the at least one second internet protocol 60b, or from the at least one second internet protocol 60b to the first internet protocol 60a, in response to a command 80 entered by the user of the wireless device 12. This command 80 is entered by the user in response to a notification 82 to the user from the data recognizer 18 of the differentiation of new or changed information by the data recognizer 18. In a third embodiment, the controller 20 switches from the first internet protocol 60a to the at least one second internet protocol 60b, or from the at least one second internet protocol 60b to the first internet protocol 60a, automatically according to the type of data 30, other data 42, or non-data 32 differentiated by the data recognizer 18, after the data recognizer 18 passes the differentiation to the controller 20 in response to a command 80 entered by the user of the wireless device 12, which command 80 is entered by the user in response to a notification 82 to the user from the data recognizer 18 of the differentiation of new or changed information by the data recognizer. The user command 80 may be entered by the user speaking aloud, if the data manager 10 includes voice recognition capability, or by the user speaking aloud, and the data recognizer 18 differentiating that the incoming data is voice data 34. Alternatively, the user command 80 may be entered by the user pressing a key on the wireless device 12, such as one of the plurality of keys on a numerical keypad of a wireless telephone.

Figure 2:
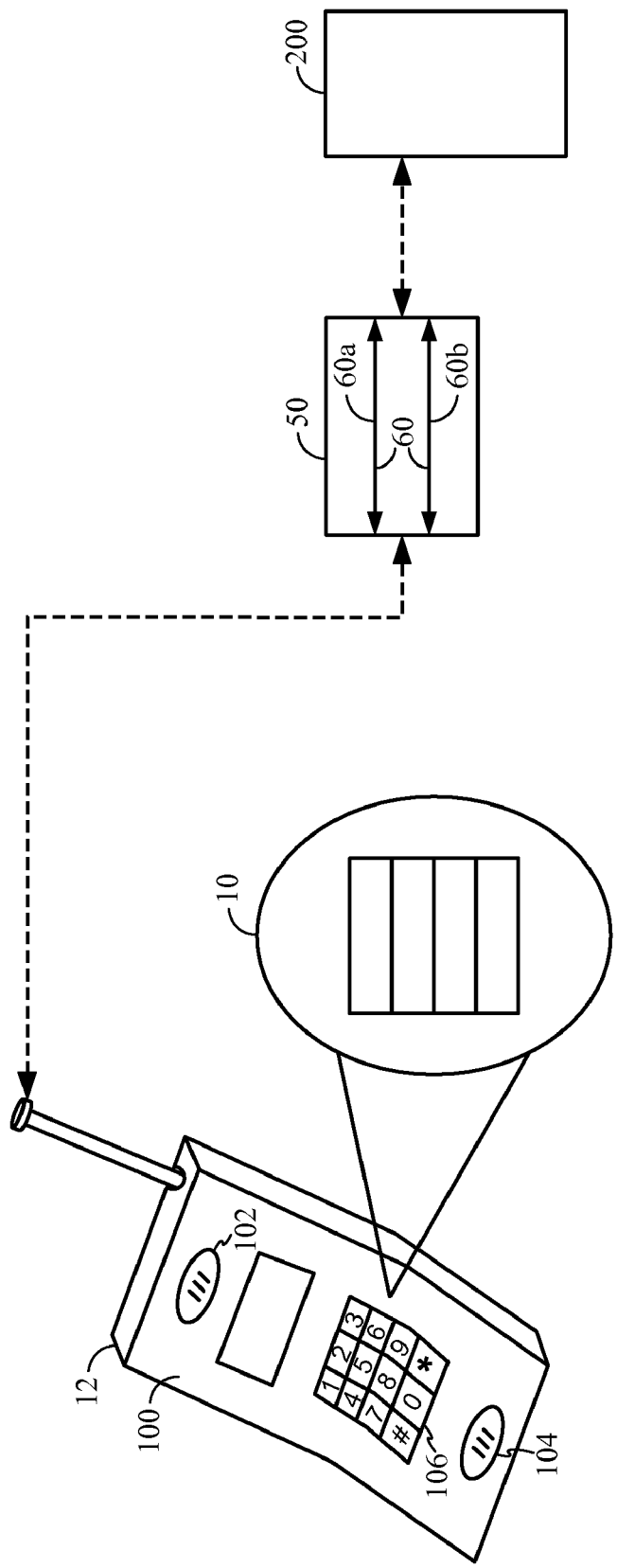
FIG. 2 illustrates the interaction between the data manager of FIG. 1 and a wireless device.

FIG. 2 illustrates the interaction between the data manager 10 of FIG. 1 and the wireless device 12. The data manager 10 is modular to the wireless device 12, and is preferably mounted within the wireless device 12. The data manager 10 may be, for example, a software audio plug-in that interacts with a web browser resident on the wireless device 12. In a preferred embodiment, the wireless device 12 is a wireless telephone, such as a cellular telephone, and may include a handset 100 having an earpiece 102, mouthpiece 104, and standard numeric or alphanumeric telephonic keypad 106. The telephone 12 may also include additional elements to simplify interaction with the internet, such as an alphabetic keypad or mouse element. The data manager 10 manages communications to and from the wireless device 12, and the wireless device 12 sends and receives the plurality of broadcasts 60a, 60b between the wireless device 12 and at least one remote device 200 over at least one connection 50, and, for the purposes of the present invention, at least one of the connections is preferably an internet protocol connection 50. The remote device 200 may be, for example, at least one personal computer, or at least one second wireless device.

Figure 2A:
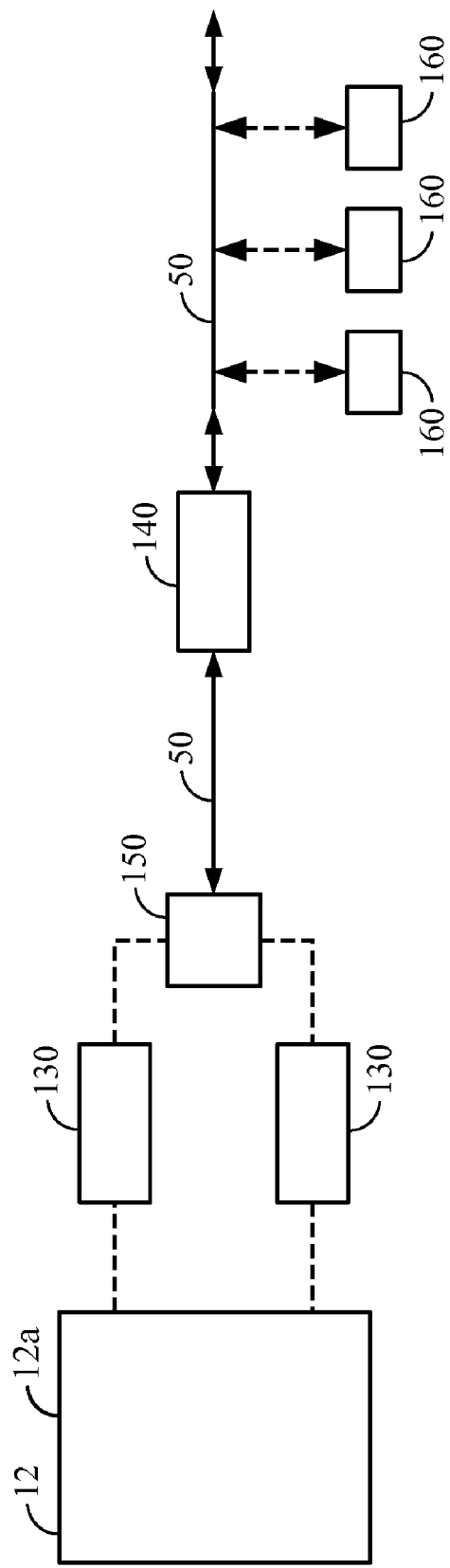
FIG. 2A illustrates an embodiment of FIG. 1 wherein the wireless device has at least one feature set that uses the first internet protocol.

FIG. 2A illustrates an embodiment wherein the wireless device 12 has at least one feature set 130 that uses the first internet protocol 60a. A feature set 130 is an application for the wireless device 12 that makes use of the wireless device 12 capability to communicate over the internet protocol connection 50. The feature sets 130 allow specific types of communication over the internet protocol connection 50, and the feature sets 130 may be created, changed, or controlled at a base site 140, such as an internet site located on the internet protocol connection 50. The feature sets 130 may be, for example, multipoint conferencing, a virtual CB, interactive gaming, or a virtual community. For example, a first wireless device 12a, in the form of a wireless telephone, may dial into an internet protocol connection 50 using a local dial-up telephone network number 150. That first wireless device 12a may then communicate with, for example, family members 160 who are enrolled in a virtual community entitled "Family One", which virtual community may be based on the base web site 140, and which virtual community may be controlled by any community member who is enrolled in the community and who has access to the site 140. This communication with the virtual community may require preliminary navigation on the internet in order to reach the community. Upon connection to "Family One", the first wireless device 12a may then communicate verbally with other "Family One" members 160 who are currently connected to "Family One", or may send out a "call" to all "Family One" members, alerting other members that they can connect to the site should they wish to communicate with the user of the first wireless device 12a. This "call" may take the form of an email, or an internet web page, displayed to all users then logged on to the internet, or a page to those who are not then logged on. Those other members 160 can then communicate with the first wireless device 12a user using a desktop computer, a laptop computer, or a second wireless device dialing into a local dial-up internet service. In one embodiment, if no community members 160 are present at the base site 140, there is no calling charge to the user of the first wireless device 12a for the dial-up session.

Figure 2B:
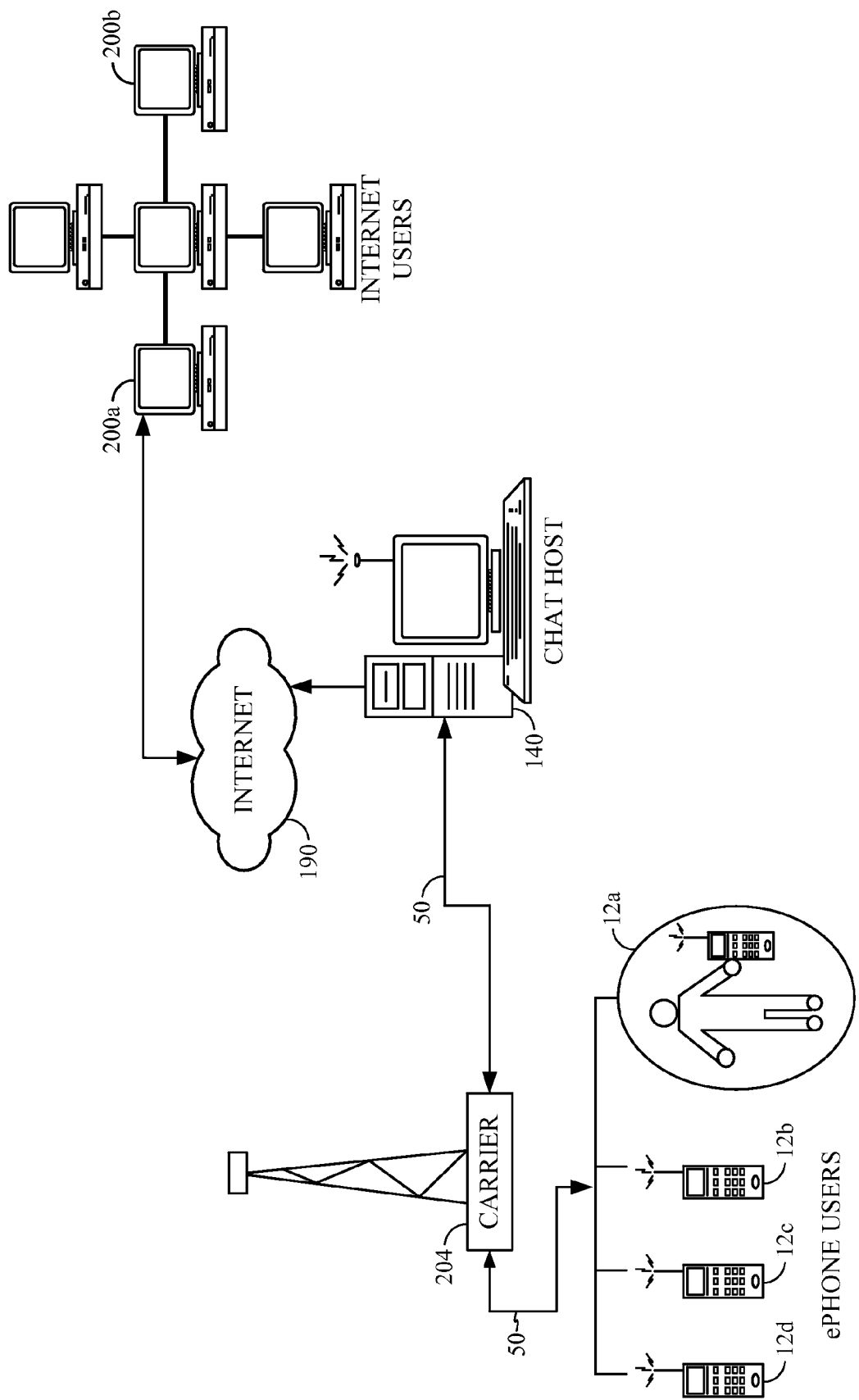
FIG. 2B is a simplified illustration of community interactions using the wireless device having a data manager.

FIG. 2B is a simplified illustration of community interactions using the wireless device 12a having a data manager 10. A user of the wireless device 12a, or any member of the community with access to the internet 190, such as at a second wireless device 12b, 12c, 12d or at a remote input terminal 200a, 200b (i.e. desktop or laptop), may enter an internet instruction, such as to change the internet address location, or, more particularly, may change the base web site 140. This instruction may be entered from the wireless device 12a through a wireless carrier 204, or may be entered from a remote input terminal 200 directly to the internet 190. As noted above, the base site 140 may be a chat host. The internet instruction controls the base site 140, and may additionally be a control mechanism for the internet protocol connection 50, such as the connection 50 between the wireless device 12a and the wireless carrier 204 to which the wireless device 12a has connected for a given call. For example, the internet instruction may control the performance of a web browser integrated into the telephone handset, or may control the performance of the base web site 140, or may control the creation and/or membership and/or groupings at the base web site 140, or may control a separate web site.

Figure 3:
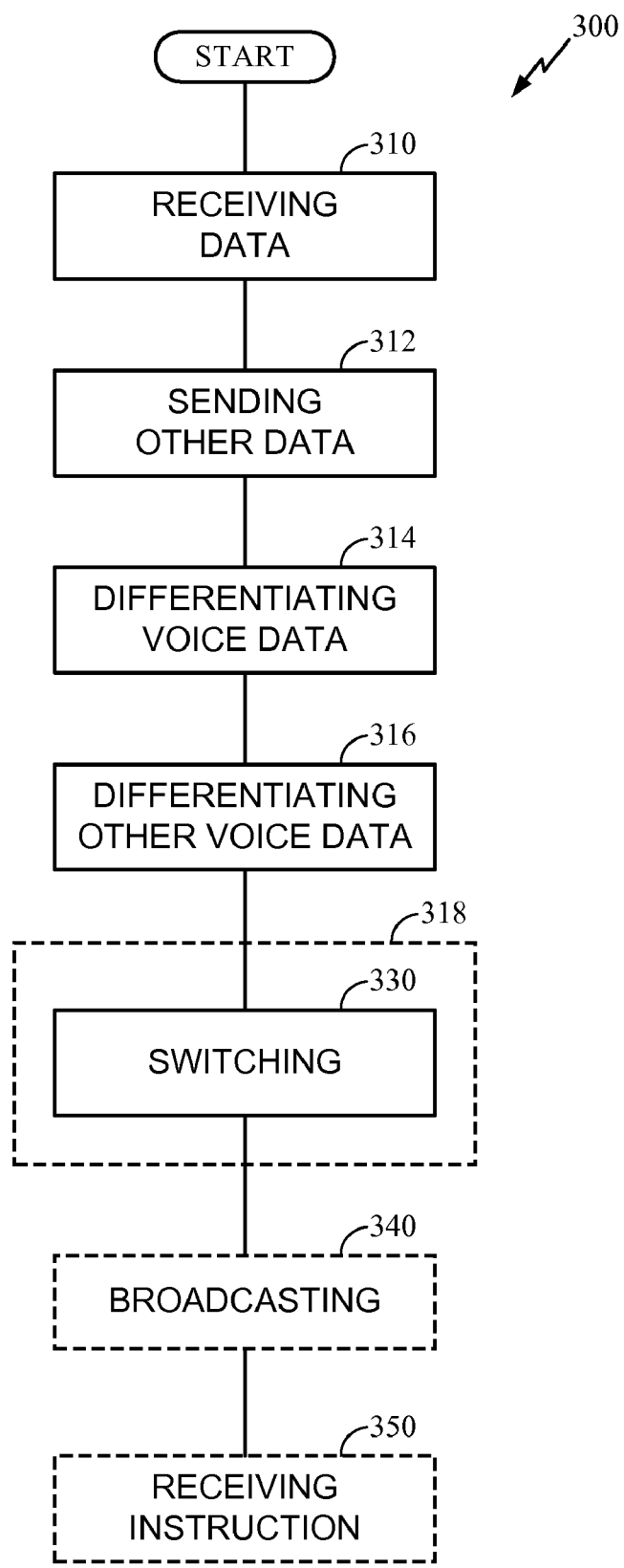
FIG. 3 is a flow diagram illustrating a method of managing data in a wireless device.

FIG. 3 is a flow diagram illustrating a method 300 of managing data in a wireless device. In a preferred embodiment of the method 300, the wireless device sends and receives a plurality of broadcasts between the wireless device and at least one remote device over an internet protocol connection, substantially as discussed hereinabove with respect to FIG. 1 and 2. The method 300 includes the step 310 of receiving data at the wireless device, the step 312 of sending other data from the wireless device, the step 314 of differentiating the voice data, the step 316 of differentiating the other voice data, and the step 318 of controlling the broadcast of the voice data and the other voice data. The method 300 is preferably implemented using software resident within the computerized hardware of the wireless device.

The step 310 of receiving data at the wireless device occurs substantially as discussed hereinabove with respect to FIG. 1. Voice data is received at the wireless device. In the preferred embodiment, the voice data is received over the internet protocol connection. Non-voice data may also be received at the wireless device over the internet protocol connection.

The step 312 of sending other data from the wireless device occurs substantially as discussed hereinabove with respect to FIG. 1. Other voice data is sent from the wireless device. In the preferred embodiment, the other voice data is sent over the internet protocol connection. Other non-voice data may also be sent from the wireless device over the internet protocol connection.

The step 314 of differentiating the voice data from the non-voice data and/or non-data, and the step 316 of differentiating the other voice data from other non-voice data and non-data, is performed substantially as discussed hereinabove with respect to FIGS. 1 and 2.

The step 318 of controlling the broadcast of the voice data is dependant upon the differentiating steps 314, 316, as discussed hereinabove with respect to FIGS. 1 and 2. The controlling step 318 uses a first internet protocol format, such as an internet voice protocol format, for the broadcast of the voice data and the other voice data over the internet protocol connection, and uses at least one second internet protocol format for the broadcast of the non-voice data and the other non-voice data. Internet protocol is not used for the broadcast of non-data, and non-data communications are preferably not managed by the data manager. The controlling step 318 preferably includes switching 330 the broadcast between the first or second internet protocol format, depending on the data type differentiated at the differentiating steps 314, 316. The switching step 330 may include responding to an entering by the user of a command, such as by the user speaking aloud or pressing a key on the wireless device, or may include an automatic switching of the broadcast upon differentiating of the voice data or the other voice data at the differentiating steps 314, 316.

The method 300 also preferably includes the step 340 of broadcasting the voice data and/or the other voice data, or the non-voice data and/or the other non-voice data, either to the user or to the environment, as discussed hereinabove with respect to FIGS. 1 and 2. The step 340 of broadcasting may include activating a voice coder by using the CODEC controlled by the controlling step 318, which voice coder activation allows the sending of voice packets over the internet protocol connection. The broadcasting step 340 preferably substantially eliminates latency in the broadcast. In order to eliminate latency, the broadcasting step 340 may occur at communication rates of up to 2 MegaBits per second.

The method 300 may also include the step 350 of receiving an internet instruction from the user via an internet interface communicatively connected to the wireless device. The internet instruction then controls the performance of the internet protocol connection, or controls the performance of the internet or internet location, such as at the base site for a virtual community.

Those of ordinary skill in the art will recognize that many modifications and variations of the present invention may be implemented. For example, with minor modifications, the present invention may be used to communicate, using internet protocol, directly between a wireless device and a laptop or desktop computer. The foregoing description and the following claims are intended to cover all such modifications and variations.

The invention claimed is:

1. A data manager for a wireless device, wherein the wireless device sends and receives a packetized data between the wireless device and at least one remote device over an internet protocol connection, the packetized data including voice data that has a first internet protocol format, and also including non-voice data that has at least one second internet format different from the first internet protocol format, and wherein the data manager is communicatively connected to the wireless device, comprising:
    a data receiver that receives voice data and non-voice data over the internet protocol connection;
    a data sender that sends voice data and non-voice data over the internet protocol connection;
    a data recognizer that differentiates the voice data from the non-voice data at said data receiver;
    a voice coder for encoding and decoding data with the first internet protocol format;
    a CODEC for encoding and decoding data with the second internet protocol format; and
    a controller that controls reception at said data receiver of the packetized data according to the differentiation by the data recognizer. wherein said controller switches the wireless device to the voice coder for decoding and coding a first internet protocol format for receiving and sending the voice data, and switches the wireless device to the CODEC for coding and decoding the at least one second internet protocol format for receiving and sending the non-voice data.

2. The data manager of claim 1, wherein the data manager is resident in the wireless device.

3. The data manager of claim 1, wherein said controller switches from the first internet protocol to the at least one second internet protocol, or from the at least one second internet protocol to the first internet protocol, automatically according to the type of data differentiated by said data recognizer.

4. The data manager of claim 1, wherein said controller switches from the first internet protocol to the at least one second internet protocol, or from the at least one second internet protocol to the first internet protocol, in response to a command entered by a user of the wireless device, which command is entered according to the differentiation by said data recognizer.

5. The data manager of claim 3 or 4, wherein the switching occurs during a call on the wireless device.

6. The data manager of claim 3 or 4, wherein the switching occurs between at least two calls on the wireless device.

7. The data manager of claim 4, wherein the command is entered by the user speaking aloud.

8. The data manager of claim 4, wherein the wireless device includes at least one key, and wherein the command is entered by the user pressing the at least one key on the wireless device.

9. The data manager of claim 1, wherein only voice data and other voice data comprise a first call.

10. The data manager of claim 1, wherein said controller switches from the at least one second internet protocol to the first internet protocol automatically upon differentiation by said data recognizer of voice data.

11. The data manager of claim 1, wherein said controller switching to the first internet protocol includes said controller activating the voice coder, thereby allowing the sending of voice packets over the internet protocol connection.

12. The data manager of claim 1, wherein the voice data is transmitted at a rate that substantially eliminates latency.

13. The data manager of claim 1, wherein the wireless device has at least two feature sets that use the first internet protocol.

14. The data manager of claim 13, wherein the at least two feature sets are selected from the group consisting of multipoint conferencing, virtual CB, interactive gaming, and a virtual community.

15. The data manager of claim 1, wherein an internet instruction is entered by a user, and wherein the internet instruction controls the internet protocol connection.

16. The data manager of claim 15, wherein the internet instruction is a control mechanism.

17. The data manager of claim 16, wherein the internet instruction is a creation of a grouping for a virtual community.

18. The data manager of claim 15, wherein the internet instruction is entered by the user at a remote internet terminal.

19. The data manager of claim 15, wherein the internet instruction is entered by the user at the wireless device.

20. The data manager of claim 1, comprising means for providing a communication rate of said packetized data of up to 2 Mbits per second.

21. A wireless telephone for receiving and sending packetized data including voice data that has a first internet protocol format and non-voice data that has a second internet protocol format, comprising:
    a handset;
    an internet interface resident on said handset;
    a wireless connection between said handset including an internet protocol connection that uses the internet interface, wherein said internet protocol connection passes voice data, other voice data, and non-voice data to said internet interface; and
    a voice coder for encoding and decoding data with a first internet protocol format;
    a CODEC for encoding and decoding data with a second internet protocol format; and
    a data manager resident on said handset, and communicatively connected to said internet interface, wherein said data manager comprises:
    a data receiver that receives the voice data and non-voice data over the internet protocol connection;
    a data sender that sends the other voice data and other non-voice data over the internet protocol connection;
    a data recognizer that substantially continuously monitors the packetized data received by the data receiver, and differentiates the voice data from the non-voice data and non-data; and
    a controller that controls the selection between the voice coder and the CODEC substantially continuously during the internet protocol connection to supply the voice data and the other voice data to the voice coder thereby providing an internet voice protocol format during the internet protocol connection, according to the differentiation by the data recognizer, wherein said controller switches from the internet voice protocol format to at least one second internet protocol upon differentiation of the non-voice data by said data recognizer.

22. The wireless telephone of claim 21, wherein said internet interface comprises a web browser.

23. The wireless telephone of claim 21, wherein said controller switches from the at least one second internet protocol to the internet voice protocol format upon differentiation of voice data or other voice data by said data recognizer.

24. The wireless telephone of claim 23, wherein said controller switches from the internet voice protocol format to the at least one second internet protocol, or from the at least one second internet protocol to the internet voice protocol format, in response to a command entered by a user of the wireless device, which command is entered to said handset.

25. The wireless telephone of claim 23, wherein said controller switches from the internet voice protocol format to the at least one second internet protocol, or from the at least one second internet protocol to the internet voice protocol format, automatically upon differentiation by said data recognizer.

26. The wireless telephone of claim 21, wherein said internet interface receives an internet instruction from a user via said handset, and wherein the internet instruction controls the internet protocol connection.

27. A data manager for a wireless device, wherein the wireless device sends and receives packetized data including voice data that has a first internet protocol format and non-voice data that has a second internet protocol format, said packetized data being communicated between the wireless device and at least one remote device over an internet protocol connection, and wherein the data manager is communicatively connected to the wireless device, comprising:
    means for receiving voice data and non-voice data at the wireless device;
    means for sending other voice data and other non-voice data from the wireless device;
    means for differentiating the voice data from the non-voice data; and
    voice coder means for encoding and decoding data with a first internet protocol format;
    CODEC means for encoding and decoding data with a second internet protocol format; and
    means for controlling reception of the voice data and the non-voice data according to the differentiating of the voice data from the non-voice data, and for controlling sending of the other voice data and the other non-voice data, according to the differentiating of the other voice data from the other non-voice data;
    wherein said means for controlling switches to a first internet protocol format for receiving the voice data and the other voice data, and switches to at least one second internet protocol format for sending the non-voice data and the other non-voice data.

28. A method of managing data in a wireless device, wherein the wireless device sends and receives packetized data between the wireless device and at least one remote device over an internet protocol connection, wherein the voice data packets have a first internet protocol format and the non-voice data packets have at least one second internet protocol format, comprising the steps of:
    receiving voice data packets and non-voice data packets at the wireless device;
    sending other voice data packets and other non-voice data packets from the wireless device;
    differentiating the received voice data packets from the non-voice data packets;
    differentiating the other voice data from the other non-voice data; and
    controlling reception of the voice data and the non-voice data according to said differentiating the voice data from the non-voice data, and controlling sending of the other voice data and the other non-voice data according to said differentiating the other voice data from the other non-voice data;

switching to a first internet protocol format for receiving and sending the voice data and the other voice data, and switching the broadcast to at least one second internet protocol format for receiving and sending the non-voice data and the other non-voice data.

29. The method of claim 28, wherein the switching step comprises responding to an entering by a user of the wireless device of a command.

30. The method of claim 29, wherein the entering of the command comprises the user speaking the command aloud.

31. The method of claim 29, wherein the entering of the command comprises the user pressing a key on the wireless device.

32. The method of claim 28, wherein the switching step comprises automatically switching by the wireless device upon differentiating of the voice data or the other voice data.

33. The method of claim 28, further comprising broadcasting the voice data.

34. The method of claim 28, further comprising broadcasting the other voice data.

35. The method of claim 33 or 34, wherein said broadcasting comprises activating a voice coder, thereby allowing the sending and reception of voice packets over the internet protocol connection.

36. A data manager for a wireless device, wherein the wireless device sends and receives packetized data over an internet protocol connection between the wireless device and at least one remote device, said packetized data including voice data packets that have a first internet protocol format, and also including non-voice data packets that have at least one second internet protocol format, and wherein the data manager is communicatively connected to the wireless device, comprising:

a data receiver that receives voice and non-voice data packets over the internet protocol connection;

a data recognizer that substantially continuously monitors incoming packetized data and differentiates the voice and non-voice packets at said data receiver;

a voice coder for decoding and encoding information in the first internet protocol format;

at least one CODEC for decoding and encoding data in the at least one second internet protocol format;

a controller connected to the data recognizer to route the packetized data responsive to the differentiation by the data recognizer, so that said controller switches the wireless device to the voice coder to decode the first internet protocol format, and switches the wireless device to the at least one CODEC to decode the at least one second internet protocol format.

37. The data manager of claim 36, wherein the data manager comprises a software audio plug-in.

38. The data manager of claim 36, wherein the controller switches from the first internet protocol to the at least one second internet protocol, or from the at least one second internet protocol to the first internet protocol, automatically according to the type of data differentiated by said data recognizer.

39. The data manager of claim 36, wherein the controller switches from the first internet protocol to the at least one second internet protocol, or from the at least one second internet protocol to the first internet protocol, in response to a command entered by a user of the wireless device, which command is entered according to the differentiation by said data recognizer.

40. The data manager of claim 39, wherein the command is entered by the user speaking aloud.

41. The data manager of claim 39, wherein the wireless device includes at least one key, and wherein the command is entered by the user pressing the at least one key on the wireless device.

42. The data manager of claim 36, wherein the wireless device has at least two feature sets that use the first internet protocol.

43. The data manager of claim 42, wherein the at least two feature sets are selected from the group consisting of multipoint conferencing, virtual CB, interactive gaming, and a virtual community.

44. The data manager of claim 36, wherein an internet instruction is entered by a user, and wherein the internet instruction controls the internet protocol connection.

45. The data manager of claim 44, wherein the internet instruction is a control mechanism.

46. The data manager of claim 45, wherein the internet instruction is a creation of a grouping for a virtual community.

* * * * *